United States Patent Office 3,193,597
Patented July 6, 1965

3,193,597
ISOMERIZATION OF PARAFFIN HYDROCARBONS
William Schoen, Houston, Tex., assignor to Standard Oil Company, Chicago, Ill., a corporation of Indiana
No Drawing. Filed Dec. 29, 1961, Ser. No. 163,024
8 Claims. (Cl. 260—683.75)

This invention relates to isomerization of less branched hydrocarbons to more highly branched hydrocarbons. More particularly, it relates to the isomerization of paraffinic hydrocarbons. Specifically, it relates to the use of charcoal as a selective activator in the isomerization of paraffinic hydrocarbons using a cocatalyst of aluminum halide and a solid salt of an inorganic acid.

As the compression ratios of automobile engines are increased and higher horsepower and more efficient engines are being developed, specifications of gasolines are more stringent so as to require higher quality in respect to octane number and volatility than has previously been necessary. One of the petroleum refining processes available to refiners for producing high octane blending stocks is the isomerization of paraffins, particularly light paraffins. The light paraffins which are normally available for blending in gasoline have an octane number rating in the range of 60 to 80. In the case of hexanes, the dimethyl butanes have octane numbers in the range of 100 or higher, while the methyl pentanes and normal hexanes have an octane number of less than 80. Thus it is highly desirable to isomerize hexanes to dimethyl butanes in order to produce high octane, low volatility blending stocks.

Known isomerization processes utilized acid catalysts such as the Friedel-Crafts halides. These can be used in a liquid complex with hydrocarbon, with or without promoters, such as antimony trichloride or they may be used in a fixed bed system wherein the aluminum chloride is deposited upon a support. In either case, the acid catalyst must be activated by a hydrogen halide such as hydrogen chloride. The isomerization can be carried out with the hydrocarbon in the liquid phase or vapor phase. Each of the known catalysts for isomerization of petroleum fractions has specific disadvantages. Thus, researchers in this field are constantly seeking improved isomerization catalyst systems.

I have discovered that charcoal will selectively activate the catalytic isomerization of less branched hydrocarbons to more highly branched hydrocarbons when using a cocatalyst of aluminum halide and a solid salt of an inorganic acid. This discovery is exactly opposite to what would be expected since the prior art teaches the use of charcoal as an inhibitor to moderate the activity of isomerization catalyst while in my catalyst system charcoal acts as an activator for selective isomerization. I have found that charcoal is particularly useful as an activator for a liquid phase hexane isomerization catalyst of aluminum chloride and calcium phosphate. Cyclohexane is preferably added to the reaction as a catalyst inhibitor to control the formation of cracking and disproportionation products.

It has been discovered that hexanes can be readily isomerized in the liquid state to obtain high conversions of prolonged times using a solid catalyst at moderate temperature conditions. The process is carried out at a temperature from about 80° F. to about 200° F. The time of contacting the hexane with the catalyst is sufficient to produce the desired conversion or the maximum conversion possible under the particular conditions. The solid catalyst used consists of an aluminum halide positioned on the surface of a cocatalytic particulate solid which is a salt of an inorganic acid.

The charge to the process consists of hexanes in the liquid phase. Sufficient pressure is applied to the feed to maintain it in the liquid state. The process will convert n-hexane to a mixture of methyl pentanes and dimethyl butanes. On the other hand, methyl pentanes can be converted to a mixture of dimethyl butanes. A close approach to the equilibrium mixture at the particular temperature of contact with the catalyst is obtainable at a sufficient contacting time.

While batch operations are described below it should be understood that flow operations are possible through a fixed bed of the defined cocatalyst. In such operations a space velocity (weight of oil per hour per weight of catalyst) will be in the range of 0.05 to 0.5 at temperatures of about 80° F. to 200° F.—the higher the temperature, the higher the permissible space velocity—provided there is near equilibrium conversion of hexanes with no significant loss to lower boiling products. When operating in the range of about 120° F. to 170° F. with methyl pentane as charge, the preferred weight hourly space velocity falls in the range of 0.07 to 0.15.

It has been discovered that maximum catalyst activity maintenance is obtained by adding to the catalyzed reaction zone, continuously along with the feed, aluminum halide of the type present on the catalyst. It is preferred that the hexane feed be substantially saturated with the particular aluminum halide at about the temperature at which the isomerization reaction takes place. This is readily done by passing the feed stream through a saturator vessel containing bulk aluminum halide such as aluminum trichloride under conditions such that the liquid stream dissolves the desired amount of the aluminum halide. (The saturation of the feed with aluminum halide is carried out under conditions such that the amount of aluminum halide-hydrocarbon complex formed is kept to a level below that which would cause catalyst activity degradation.) Under some conditions, it may be desirable to operate the saturator above isomerization temperature and cool the saturated stream to isomerization temperature. The presence of dispersed solid aluminum halide does not have any harmful effect on the catalyst and permits introducing more aluminum halide into the system than by operation of the saturator at isomerization temperature.

When operating with catalyst containing large amounts of aluminum halide or operating at temperatures of 160° F. and above, some aluminum chloride is dissolved out of the catalyst bed and passes out with the product effluent stream. This dissolved aluminum halide may be recovered by passing through a bed of cocatalytic solid particles. Other recovery schemes may be used as are known to the art.

The solid catalyst utilized in the instant process is a solid in particulate form. The catalyst may range in size from particles of pea-size to flour-like powder, which fineness is preferred with solid salt. The catalyst consists essentially of aluminum halide and the solid salt. The solid determines the particle size of the effective catalyst itself as well as functioning as a cocatalyst.

The cocatalyst solid may be a solid salt of an inorganic acid which is substantially inactive with respect to aluminum halide and yet able to have aluminum halide adhere to its suface. The solid salt itself does not react with the hydrocarbon being treated to effect any significant chemical change under the conditions of the process.

The solid salt of an inorganic acid is substantially inactive with respect to aluminum halide, such as aluminum trichloride, in the sense that it does not undergo metathetical reaction therewith under the conditions of the process or does not form an art-recognized complex. For example, ferric pyrophosphate and aluminum chloride react to release chlorine gas; sodium chloride and aluminum chloride form the stable complex $NaAlCl_4$.

The manner in which the aluminum halide is positioned on the surface of the solid salt is not known; it is postulated that physical adherence or complex formation or a combination of these is involved.

Illustrative salts particularly suitable for use in the catalyst are: tricalcium orthophosphate, dicalcium phosphate, monocalcium phosphate, sodium aluminum phosphate (acidic), monomagnesium phosphate, dibasic magnesium phosphate, calcium pyrophosphate, acid lithium arsenate, tricalcium phosphate, ⅓ calcium hydroxide (tricalcium phosphate, NF grade) and dicalcium arsenate. Other solid salts are zirconium sulfate, manganese sulfate, titanium sulfate, basic aluminum chromate, basic cobalt borate, basic nickel arsenite, nickel silicotungstate, cadmium borotungstate and nickel silicomolybdate.

The catalyst is readily prepared by dissolving aluminum halide in the feed hydrocarbons and passing this solution through a bed of the solid salt or agitating the solution with solid salt to form a slurry of the solid salt in the solution; the halide "adheres" to the surface of the solid salt to form the catalyst.

The solid salt catalyst consists essentially of from about 5 to about 90 weight percent of aluminum halide and the remainder essentially the hereinabove defined solid salt; more commonly, the catalyst contains 10–75 weight percent of aluminum halide. It is preferred to use solid salt catalyst containing from about 25–60 weight percent of $AlCl_3$, particularly when the solid is a salt of phosphoric acid.

In the practice of my invention, charcoal is used as a selective activator for the cocatalyst of aluminum halide and a solid salt of an inorganic acid. The charcoal activates the catalyst so as to selectively produce a higher yield of dimethyl butanes which are the high octane components obtained from isomerizing hexanes. The amount of charcoal used in the isomerization reaction is from 2 to 20 weight percent, based on the hydrocarbon, and preferably from 5 to 12 percent. The charcoal may be in any one of the various ground forms which are commercially available. The particular size is not critical. However, it is preferably finely ground to about the size of fine sand. The charcoal can be intermixed physically with the solid support before or after deposition of the aluminum halide. When practicing the invention using the cocatalyst as a slurry in a slurry bed, the charcoal can be added in the powered form to the slurry bed.

Since the aluminum halide support on a solid salt of an inorganic acid in the presence of charcoal is a highly active catalyst for isomerization of paraffins, I have found it advantageous to control cracking and disproportionation by the addition of cyclohexane to the reaction mixture. Generally, the amount of cyclohexane which can be used is from 2 to 10% by volume, based on feed. The preferred amount is from 3 to 7 volume percent, and I have found 5% to be very beneficial.

It has been found desirable to have an olefinic compound present as a catalyst initiator. This olefin can be a $C_4$, $C_5$ or $C_6$, preferably a $C_5$ such as pentene-2. From 0.1 to 2 volume percent, based on feed hydrocarbon, can be used, preferably about 0.5 volume percent. The olefinic initiator will react with the aluminum chloride, thus only an amount sufficient to initiate the reaction should be used since the aluminum chloride will be consumed and hydrocarbon complexes formed which will lead to catalyst deactivation.

To demonstrate the advantage of the use of charcoal as an activator for the aluminum halide-solid salt of an inorganic acid cocatalyst for isomerization, the following series of isomerization runs was made.

RUN 1

To a batch, stirred 660 ml. glass reactor equipped with a Dry Ice-acetone cooled knock-back condenser were added 400 ml. of dried 2-methyl pentane, 2.4 ml. of pentene-2, 20 ml. of cyclohexane, 260 gms. of powdered aluminum chloride and 260 gms. powdered calcium hydrogen phosphate. The reactor was closed and stirred at about 1800 r.p.m. for 4 hours while maintaining the temperature in the range of 35° C. to 38° C. At the end of the reaction time the reactants were allowed to settle and the isomerized product analyzed. The result of the analysis of the $C_6$ fraction is shown in Table 1 below.

RUN 2

This run was a duplicate of Run 1 above using the same equipment and same proportion of reactants and catalyst under the same conditions. The results of this run are shown in Table 1 below.

RUN 3

In this run the effectiveness of charcoal was shown by adding to the same reactor as used in Run 1 above the same amounts of reactants and catalysts along with 20 gms. of powdered charcoal (Norite A). The reactor was closed and stirred at about 1800 r.p.m. for 4 hours while maintaining the temperature in the range of 35° C. to 38° C. The reactants were allowed to settle and the isomerized product analyzed. The analysis of the $C_6$ fraction is shown in Table 1 below.

RUN 4

To verify Run 3 above, to the same glass stirred reactor as used in Run 1 above were added 360 ml. of dried 2-methyl pentane, 2.16 ml. of pentene-2, 18 ml. of cyclohexane, 234 gms. of powdered aluminum chloride, 234 gms. of powdered calcium hydrogen phosphate and 18 gms. of powdered charcoal. The reactants were stirred at about 1800 r.p.m. for 2 hours at a temperature in the range of 35° C. to 38° C. and allowed to settle. The isomerized product was withdrawn and the $C_6$ fraction analyzed and the results are shown in Table 1 below.

*Table 1*

| | $C_6$ product composition, wt. percent | | | |
|---|---|---|---|---|
| | Charcoal absent | | Charcoal present | |
| Run No | 1 | 2 | 3 | 4 |
| 2,2-Me$_2$C$_4$ | 43.9 | 46.5 | 51.2 | 48.4 |
| 2,3-Me$_2$C$_4$ | 10.6 | 9.8 | 9.4 | 9.7 |
| 2-MeC$_5$ | 27.0 | 25.9 | 25.5 | 25.0 |
| 3-MeC$_5$ | 13.1 | 11.5 | 9.4 | 11.2 |
| MCP | | 0.4 | | 0.3 |
| nC$_6$ | 5.4 | 5.9 | 4.5 | 5.4 |

It will be seen from Table 1 above that in Runs 1 and 2, where no charcoal was present, only 54.5 wt. percent and 56.3 wt. percent, respectively, of dimethyl butanes were produced. By contrast, in Runs 3 and 4, 60.6 wt. percent and 58.1 wt. percent, respectively, of dimethyl butanes were produced when charcoal was present along with the cocatalyst $AlCl_3$ plus $CaHPO_4$. Runs 1, 2 and 3 had reaction times of 4 hours while Run 4 had a reaction time of only 2 hours. Even at this shorter reaction time Run 4 produced an average of about 5% more dimethyl butanes than did Runs 1 and 2. In addition, it will be noted that an average of 9.5% increase in yield of 2,2-dimethyl butane was selectively obtained in Run 3, where the charcoal was present, as compared to Runs 1 and 2, where charcoal was not present.

Having thus described my invention, what I claim is:

1. A process for the isomerization of lesser branched paraffin hydrocarbons to more highly branched paraffin hydrocarbons, which process comprises contacting the lesser branched paraffin hydrocarbons in the liquid phase under isomerization conditions with charcoal as a selective activator in the presence of a catalyst of aluminum chloride and a solid salt of a phosphorus acid which salt is substantially inactive with respect to aluminum halide.

2. The process of claim 1 wherein the paraffin hydrocarbons have six carbon atoms.

3. The process of claim 1 wherein the solid salt of an inorganic acid is calcium hydrogen phosphate.

4. A liquid phase paraffin hydrocarbon isomerization catalyst system which comprises a cocatalyst of an aluminum chloride and a solid salt of a phosphorus acid which salt is substantially inactive with respect to aluminum halide together with charcoal as a selective activator for the production of highly branched isomers.

5. The catalyst system of claim 4 wherein the solid salt of an inorganic acid is calcium hydrogen phosphate.

6. A process for the liquid phase isomerization of paraffin hydrocarbons in the presence of a cocatalyst of aluminum chloride and a solid salt of a phosphorus acid which salt is substantially inactive with respect to aluminum halide, the improvement which comprises carrying out the reaction in the presence of charcoal.

7. The process of claim 6 wherein the paraffin hydrocarbons are hexanes.

8. The process of claim 6 wherein the solid salt of an inorganic acid is calcium hydrogen phosphate.

References Cited by the Examiner

UNITED STATES PATENTS

| | | | |
|---|---|---|---|
| 2,311,713 | 2/43 | Thomas et al. | 260—683.75 |
| 2,327,188 | 8/43 | Ipatieff et al. | 260—683.75 |
| 2,351,562 | 6/44 | Veltman | 260—683.75 |
| 2,358,011 | 9/44 | Ipatieff et al. | 260—683.75 |
| 2,464,201 | 3/49 | Latchum | 260—683.75 |
| 2,935,544 | 5/60 | Miller et al. | 252—437 |

ALPHONSO D. SULLIVAN, *Primary Examiner.*